US009684290B2

(12) United States Patent
McKinzie

(10) Patent No.: US 9,684,290 B2
(45) Date of Patent: Jun. 20, 2017

(54) MOTOR CONTROLLER AND METHOD FOR CONTROLLING A MOTOR AFTER A POWER-LOSS EVENT

(71) Applicant: Regal Beloit America, Inc., Beloit, WI (US)

(72) Inventor: Marc McKinzie, West Milton, OH (US)

(73) Assignee: Regal Beloit America, Inc., Beloit, WI (US)

( * ) Notice: Subject to any disclaimer, the term of this patent is extended or adjusted under 35 U.S.C. 154(b) by 505 days.

(21) Appl. No.: 14/269,932

(22) Filed: May 5, 2014

(65) Prior Publication Data

US 2015/0316912 A1    Nov. 5, 2015

(51) Int. Cl.
*G05B 15/00* (2006.01)
*G05B 15/02* (2006.01)
*G05B 19/042* (2006.01)
*H02P 29/024* (2016.01)

(52) U.S. Cl.
CPC ......... *G05B 15/02* (2013.01); *G05B 19/0426* (2013.01); *H02P 29/025* (2013.01); *G05B 2219/24139* (2013.01); *G05B 2219/2614* (2013.01)

(58) Field of Classification Search
None
See application file for complete search history.

(56) References Cited

U.S. PATENT DOCUMENTS

| 5,475,292 A * | 12/1995 | Nakanishi | H02M 1/36 318/705 |
|---|---|---|---|
| 7,612,510 B2 | 11/2009 | Koehl | |
| 8,019,479 B2 | 9/2011 | Stiles et al. | |
| 8,043,070 B2 | 10/2011 | Stiles, Jr. et al. | |
| 2006/0127227 A1 | 6/2006 | Mehlhorn et al. | |
| 2008/0003114 A1* | 1/2008 | Levin | F04B 49/002 417/306 |
| 2010/0284826 A1* | 11/2010 | Reid | F04B 49/20 417/53 |
| 2011/0056028 A1* | 3/2011 | Park | D06F 35/007 8/137 |
| 2013/0106331 A1 | 5/2013 | Guzelgunler | |

* cited by examiner

Primary Examiner — Philip Wang
(74) Attorney, Agent, or Firm — Armstrong Teasdale LLP

(57) ABSTRACT

A motor controller and methods of controlling a variable speed motor using the motor controller after a power-loss event are described. The motor controller is configured to be coupled to a motor. The motor controller includes a computing device configured to determine power is being supplied to the motor controller a power-loss event. The computing device is also configured to operate the motor in accordance with a predetermined operating schedule such that the computing device operates the motor at a first speed for a first time period, and after completion of the first time period, the computing device operates the motor at a second speed for a second time period.

18 Claims, 3 Drawing Sheets

US 9,684,290 B2

MOTOR CONTROLLER AND METHOD FOR CONTROLLING A MOTOR AFTER A POWER-LOSS EVENT

BACKGROUND

The field of the disclosure relates generally to motors, and more particularly, to systems and methods for operating a motor controller.

At least some known systems used in fluid moving applications, such as pumping water or moving air (e.g., in a heating, ventilation, and air conditioning (HVAC) system) include a motor, for example a variable speed electric motor, coupled to a motor controller. Generally, a graphical user interface is coupled to the motor controller to enable a user to view a status of the motor and/or to enter operating parameters for the motor. Additionally, if the motor has a battery backup feature then the motor may run after a power loss event. Other known systems include an external controller to apply and/or remove AC power to/from the variable speed motor during a normal daily operating cycle. Use of an external controller typically requires user intervention to restart the motor after a power loss event. Upon restart of the motor in such known systems, it is not readily apparent how long each motor will operate during the day. Moreover, including a graphical user interface with a motor controller or adding an external controller has an associated cost.

BRIEF DESCRIPTION

In one aspect, a motor controller configured to be coupled to a variable speed motor is provided. The motor controller includes a computing device configured to determine when power is being supplied to the motor controller a power-loss event. The computing device is also configured to operate the variable speed motor in accordance with a predetermined operating schedule such that the computing device operates the motor at a first speed for a first time period, and after completion of the first time period, the computing device operates the motor at a second speed for a second time period.

In another aspect, a method of controlling a variable speed motor using a motor controller after a power-loss event is provided. The motor controller includes a computing device. The method includes determining, by the computing device, that power is being supplied to the motor controller after a power-loss event. The method also includes operating, by the computing device, the motor in accordance with a predetermined operating schedule, such that the computing device operates the motor at a first speed for a first time period, and after completion of the first time period, the computing device operates the motor at a second speed for a second time period.

In another aspect, a computer-readable storage device having processor-executable instructions embodied thereon is provided. The processor-executable instructions enable control of a variable speed motor using a motor controller after a power-loss event, the motor controller including a computing device. When executed by the computing device, the processor-executable instructions cause the computing device to determine power is being supplied to the motor controller after the power-loss event. The processor-executable instructions further cause the computing device to operate the motor in accordance with a predetermined operating schedule such that the computing device operates the motor at a first speed for a first time period, and after completion of the first time period, the computing device operates the motor at a second speed for a second time period.

DETAILED DESCRIPTION

In one implementation, a computer program is provided, and the program is embodied on a computer-readable medium. In an example implementation, the computer program is executed on a single computing device, without requiring a connection to a server computer. The computer program is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
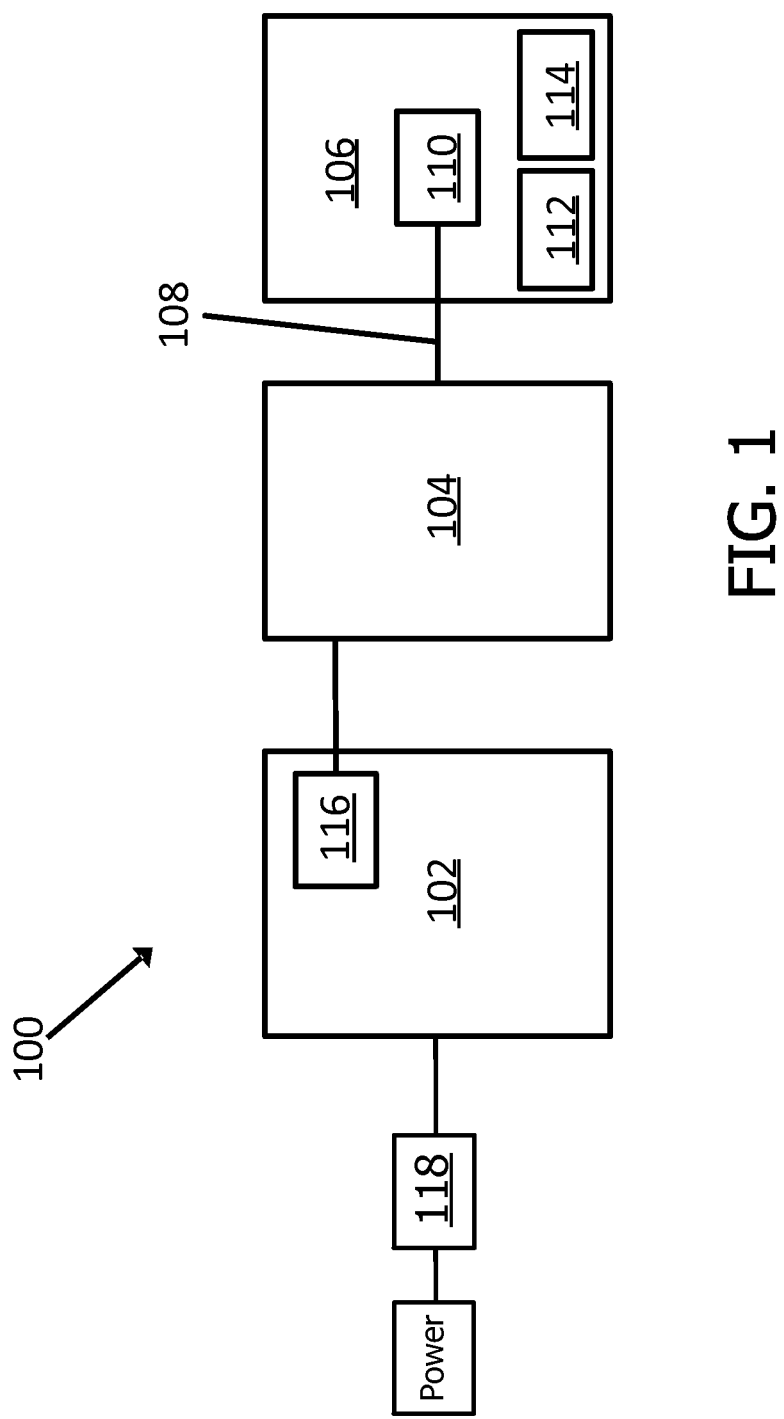
FIG. 1 is a block diagram of an example system including a motor controller that is coupled to a motor that drives a pump.

FIG. 1 is a block diagram of an example system 100 that includes a motor controller 102 coupled to a motor 104. In some implementations, motor controller 102 is incorporated within motor 104. Motor 104 may be an electric motor and, in some implementations, is an electric variable speed motor. Motor 104 drives a pump 106. More specifically, motor 104 is coupled to pump 106 by a shaft 108. Shaft 108 rotates to turn an impeller 110. Pump 106 includes an inlet 112 and an outlet 114. In some implementations, system 100 is used to move liquid, such as water, in a pool, spa, or other aquatic environment. In such implementations, inlet 112 receives the water and outlet 114 expels the received water. In other implementations, motor 104 drives a fan for moving air, for example in a heating, ventilation, and air conditioning (HVAC) system.

In the exemplary implementation, motor controller 102 includes a computing device 116. Motor controller 102 is configured to operate motor 104 according to settings stored in a memory 210 (FIG. 2) of computing device 116. The settings may include modes of operation, wherein each mode is associated with a time period and a speed. For example, one mode may be to operate motor 104 at 2100 rotations per minute (RPM) for five hours. In another implementation, the time period is specified as an absolute start time and absolute stop time, such as from 1:00 PM to 6:00 PM. One or more other modes may be based on sensing water chemistry and/or water clarity. In some implementations, system 100 includes an external timer 118 configured to apply power to motor controller 102 and/or motor 104 at a first specified time of day and to remove power from motor controller 102 and/or motor 104 at a second specified time of day. When external timer 118 is used, motor controller 102 operates motor 104 according to a specified mode. Moreover, in the exemplary implementation, computing device 116 is configured to control motor 104 using motor controller 102 after a power-loss event. A power-loss event includes any interruption of power being provided to motor controller 102, for example, a power outage or a removal of power by external timer 118.

Figure 2:
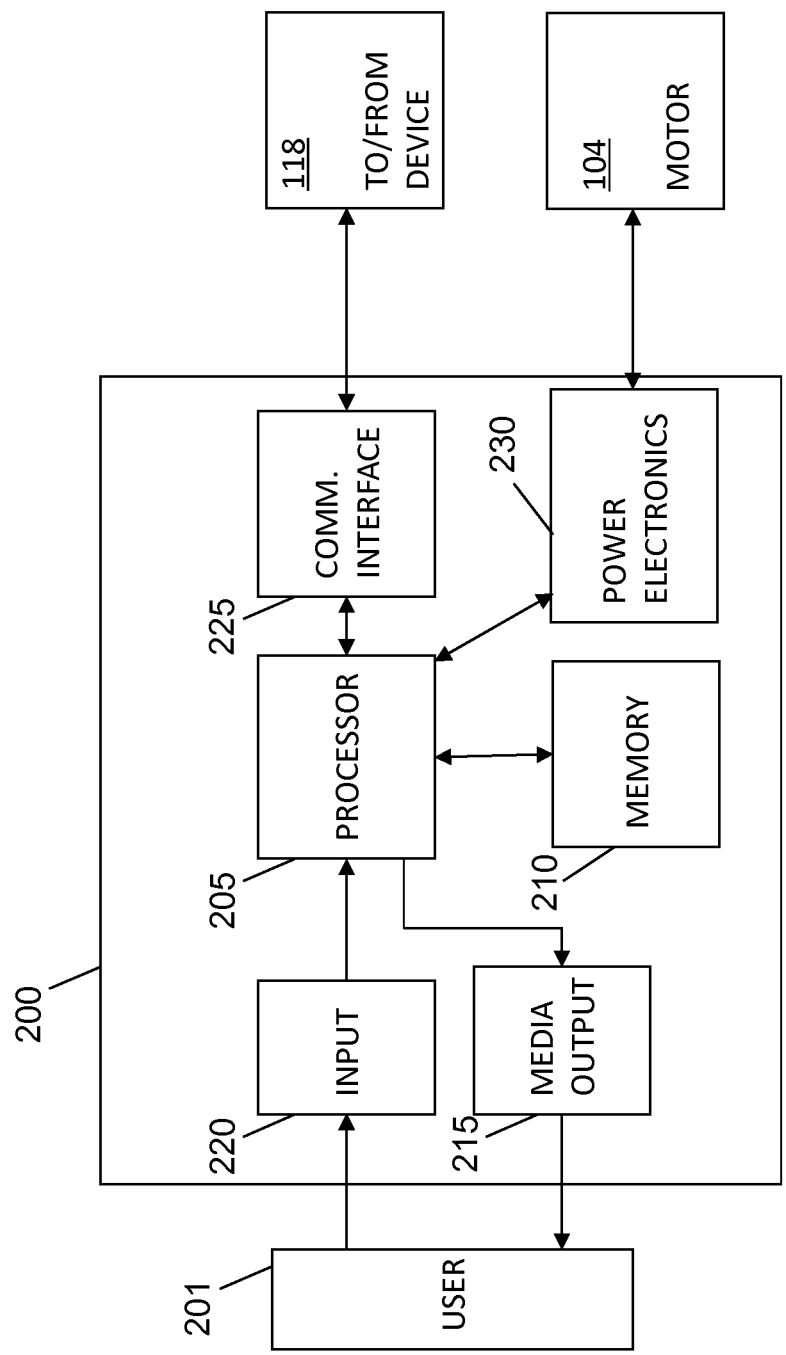
FIG. 2 is a block diagram of an example computing device that may be incorporated in the motor controller of FIG. 1.

FIG. 2 is a block diagram of an example computing device 200 that may be incorporated in motor controller 102 (FIG. 1). For example, computing device 116 may include components of computing device 200. Computing device 200 includes a processor 205 for executing instructions. In some implementations, executable instructions are stored in a memory area 210. Processor 205 may include one or more processing units (e.g., in a multi-core configuration). Memory area 210 is any device allowing information such as executable instructions and/or other data to be stored and retrieved. Memory area 210 stores settings for operating motor 104, as described herein. Memory area 210 may include one or more computer-readable media.

For example, computing device 200 stores an operating schedule for motor 104 in memory area 210. In one implementation, the operating schedule is a default operating schedule stored in memory area 210 during manufacture of motor controller 102. In another implementation, if motor controller 102 receives settings input by a user 201 to operate motor 104 at a first speed for a first time period, for example, at 3100 rotations per minute (RPM) for four hours, and at a second speed for a second time period after the first time period, for example, at 2600 RPM for five hours, computing device 200 stores the received settings in memory area 210. Thereafter, computing device 200 operates motor 104 pursuant to the received settings. After a power-loss event occurs, computing device 200 determines when motor controller 102 begins receiving power, and restarts operation of motor 104 in accordance with the operating schedule.

In some implementations, computing device 200 also includes at least one media output component 215 for presenting information to user 201. Media output component 215 is any component capable of conveying information to user 201. In some implementations, media output component 215 includes an output adapter such as a video adapter and/or an audio adapter. An output adapter is operatively coupled to processor 205 and operatively couplable to an output device such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones). In other implementations, computing device 200 does not include media output component 215. For example, some implementations of computing device 200 may not include media output component 215.

In some implementations, computing device 200 includes an input device 220 for receiving input from user 201. Input device 220 may include, for example, one or more buttons, a keypad, a touch sensitive panel (e.g., a touch pad or a touch screen), and/or a microphone. A single component such as a touch screen may function as both an output device of media output component 215 and input device 220. Some implementations of computing device 200, for example some implementations of computing device 116 (FIG. 1), do not include input device 220.

Computing device 200 may also include a communication interface 225, which is communicatively couplable to another device. For example, communication interface 225 may enable wireless communication with at least one client computing device (not shown), for example, through a short range wireless communication protocol such as Bluetooth™ or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)). In some implementations, communication interface 225 is directly capable of enabling such wireless communications. For example, in some implementations, communication interface 225 includes a wireless communication device. Additionally, communication interface 225 may couple motor controller 102 to motor 104. In such implementations, communication interface 225 may include, for example, one or more conductors for transmitting electrical signals and/or power to and/or from motor 104. Additionally, computing device 200 may also include power electronics 230 which may be coupled, for example, to processor 205 and motor 104.

Figure 3:
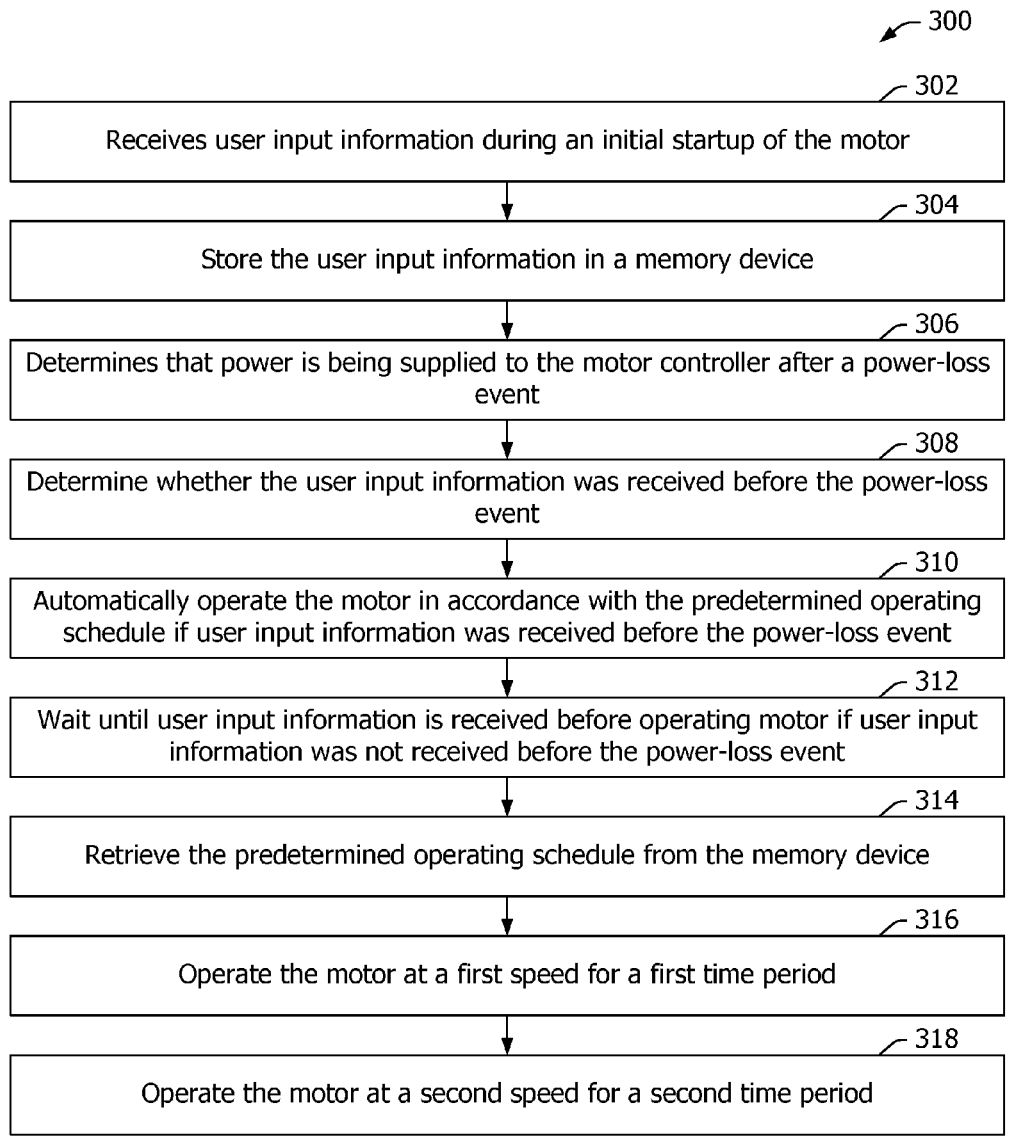
FIG. 3 is a flow chart of an example process for controlling a motor using the motor controller shown in FIG. 1 after a power-loss event.

FIG. 3 is a flow chart of an example process 300 for controlling motor 104 (FIG. 1) using motor controller 102 (FIG. 1) after a power-loss event. Process 300 may be performed by motor controller 102. More specifically, process 300 may be performed by computing device 116 (FIG. 1) of motor controller 102. Initially, computing device 116 receives 302 user input information during an initial startup of motor 104. The user input information instructs computing device 116 to begin motor operation in accordance with a predetermined operating schedule. Computing device 116 stores 304 the user input information in memory device 210 associated with computing device 116.

In the exemplary implementation, computing device 116 determines 306 that power is being supplied to motor controller 102 after a power-loss event. Computing device 116 then determines 308 whether the user input information was received before the power-loss event. If user input information was received before the power-loss event, computing device 116 automatically operates 310 motor 104 in accordance with the predetermined operating schedule. If user input information was not received before the power-loss event, computing device 116 waits 312 until user input information is received before operating motor 104.

To operate motor 104 in accordance with the predetermined operating schedule, computing device 116 retrieves 314 the predetermined operating schedule from memory device 210. The predetermined operating schedule may be a default schedule programmed into computing device 116 during manufacture or a user may input a customized operating schedule. Computing device 116 operates 316 motor 104 at a first speed for a first time period, and after completion of the first time period, computing device 116 operates 318 motor 104 at a second speed for a second time period. Computing device 116 is not limited to the two operating periods described herein, but rather, any number of operating periods may be implemented that enable computing device 116 to function as described herein. Additionally, one or more wait periods may be specified, where computing device 116 does not operate motor 104 for a specified period of time.

In one implementation, computing device 116 is coupled to external timer 118, which is configured to supply power to motor controller 102 starting at a first time of day and to stop supplying power to motor controller 102 at a second time of day. External timer 118 facilitates starting motor 104 at the exact same time every day and that motor controller 102 runs the same 24-hour operating schedule every day. Computing device 116 determines that power is being supplied to motor controller 102 at the first time of day and operates motor 104 at a first speed for a first time period. After completion of the first time period, computing device 116 operates motor 104 at a second speed for a second time period. To decrease energy consumption by motor 104, external timer removes power supplied to motor controller 102. Computing device 116 then ceases operation of motor 104 when external timer 118 stops supplying power at the second time of day. As described above, computing device 116 is not limited to the two operating periods described herein, but rather, any number of operating periods may be implemented that enable computing device 116 to function as described herein.

The methods and systems described herein may be implemented using computer programming or engineering techniques including computer software, firmware, hardware or any combination or subset thereof, wherein the technical effect may include at least one of: (a) determining, by a computing device, that power is being supplied to a motor controller after a power-loss event; and (b) operating, by the computing device, a variable speed motor in accordance with a predetermined operating schedule, such that the computing device operates the motor at a first speed for a first time period, and after completion of the first time period, the computing device operates the motor at a second speed for a second time period.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

Exemplary embodiments of systems and methods for enabling control of a motor using a motor controller after a power-loss event are described herein. The motor controller is programmed to automatically restart operation of a motor after a power-loss event according to an operating schedule stored therein. Thus, the motor controller does not require a costly LCD or LED display for user programming purposes. Without a LCD or LED display, the cost and size of the motor controller are reduced. The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller configured to be coupled to a variable speed motor, said motor controller comprising a computing device configured to:
   determine power is being supplied to the motor controller after a power-loss event;
   determine whether user input information was received before the power-loss event; and
   operate the motor in accordance with a predetermined operating schedule such that said computing device operates the motor at a first speed for a first time period, and after completion of the first time period, said computing device operates the motor at a second speed for a second time period.

2. The motor controller of claim 1, wherein said computing device is further configured to receive the user input information during an initial startup of the motor, the user input information instructing said computing device to begin motor operation in accordance with the predetermined operating schedule.

3. The motor controller of claim 2, wherein said computing device is further configured to store the user input information in a memory device associated with said computing device.

4. The motor controller of claim 1, wherein said computing device is further configured to automatically determine power is being supplied to the motor controller after a power-loss event and to automatically operate the motor in accordance with the predetermined operating schedule.

5. The motor controller of claim 1, wherein said computing device is further configured to automatically operate the motor in accordance with the predetermined operating schedule when the user input information was received before the power-loss event.

6. The motor controller of claim 1, wherein said computing device is further configured to wait until user input information is received before operating the motor when the user input information was not received before the power-loss event.

7. The motor controller of claim 1, wherein said computing device is further configured to retrieve the predetermined operating schedule from a memory device associated with said computing device.

8. The motor controller of claim 1, wherein said computing device is further configured to:
operate the motor at a third speed for a third time period after completion of the second time period.

9. A method of controlling a variable speed motor using a motor controller after a power-loss event, the motor controller including a computing device, said method comprising:
determining, by the computing device, that power is being supplied to the motor controller after a power-loss event;
determining whether user input information was received before the power-loss event; and
operating, by the computing device, the motor in accordance with a predetermined operating schedule, such that the computing device operates the motor at a first speed for a first time period, and after completion of the first time period, the computing device operates the motor at a second speed for a second time period.

10. The method of claim 9, further comprising receiving the user input information during an initial startup of the motor, the user input information instructing the computing device to begin motor operation in accordance with the predetermined operating schedule.

11. The method of claim 9, further comprising automatically operating the motor in accordance with the predetermined operating schedule when the user input information was received before the power-loss event.

12. The method of claim 9, further comprising waiting until user input information is received before beginning motor operation when the user input information was not received before the power-loss event.

13. The method of claim 9, further comprising automatically determining power is being supplied to the motor controller after a power-loss event and automatically operating the motor in accordance with the predetermined operating schedule.

14. The method of claim 9, wherein the motor controller is coupled to an external timer configured to supply power to the motor controller starting at a first time of day and to stop supplying power from the motor controller at a second time of day, said method further comprising:
determining power is being supplied to the motor controller at the first time of day;
operating the motor at a first speed for a first time period;
after completion of the first time period, operating the motor at a second speed for a second time period; and
ceasing operation of the motor when the external timer stops supplying power at the second time of day.

15. A non-transitory computer-readable storage device having processor-executable instructions embodied thereon, enabling control of a variable speed motor using a motor controller after a power-loss event, the motor controller including a computing device, wherein when executed by the computing device, the processor-executable instructions cause the computing device to:
determine power is being supplied to the motor controller after the power-loss event;
determine whether user input information was received before the power-loss event; and
operate the motor in accordance with a predetermined operating schedule such that the computing device operates the motor at a first speed for a first time period, and after completion of the first time period, the computing device operates the motor at a second speed for a second time period.

16. The non-transitory computer-readable storage device of claim 15, wherein to determine whether the user input information was received before the power-loss event, said processor-executable instructions further cause the computing device to:
receive the user input information instructing the computing device to begin motor operation in accordance with the predetermined operating schedule;
automatically operate the motor in accordance with the predetermined operating schedule when the user input information was received before the power-loss event; and
wait until user input information is received before operating the motor when the user input information was not received before the power-loss event.

17. The non-transitory computer-readable storage device of claim 15, wherein the motor controller is coupled to an external timer configured to supply power to the motor controller starting at a first time of day and to stop supplying power from the motor controller at a second time of day, said processor-executable instructions further cause the computing device to:
determine power is being supplied to the motor controller at the first time of day;
operate the motor at a first speed for a first time period;
after completion of the first time period, operate the motor at a second speed for a second time period; and
cease operation of the motor when the external timer stops supplying power at the second time of day.

18. A motor controller configured to be coupled to a variable speed motor, said motor controller comprising a computing device configured to:
determine power is being supplied to the motor controller after a power-loss event,
wherein said computing device is coupled to an external timer configured to supply power to the motor controller starting at a first time of day and to stop supplying power from the motor controller at a second time of day, said computing device is further configured to:
determine power is being supplied to the motor controller at the first time of day;
operate the motor at a first speed for a first time period;
after completion of the first time period, operate the motor at a second speed for a second time period; and
cease operation of the motor when the external timer stops supplying power at the second time of day.

\* \* \* \* \*